United States Patent Office 3,538,104
Patented Nov. 3, 1970

3,538,104
PYRIDYL-2-IMIDAZOLONES
Norbert Gruenfeld, Bronx, and Enos C. Pesterfield, Jr., Briarcliff Manor, N.Y., assignors to Geigy Chemical Corporation, Ardsley, N.Y., a corporation of New York
No Drawing. Filed Feb. 28, 1969, Ser. No. 803,458
Int. Cl. C07d 31/44
U.S. Cl. 260—294.8    12 Claims

ABSTRACT OF THE DISCLOSURE

Substituted pyridyl-2-imidazolones and their acid addition salts which are analgesic, anti-inflammatory, and antipyretic agents. An illustrative embodiment is 1-methyl-5-(2-pyridyl)-2-imidazolone.

DETAILED DESCRIPTION

The present invention pertains to compounds of the formula

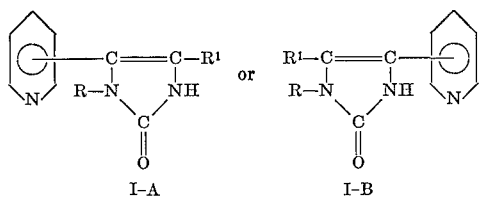

wherein $R^1$ is hydrogen or lower alkyl, and
R is lower alkyl or allyl and pharmaceutically acceptable acid addition salts thereof.

The present invention also relates to novel methods and compositions utilizing a compound of Formula I-A or Formula I-B for the treatment of inflammatory conditions, pain, and fever in warm-blooded animals, particularly mammals.

The term "lower alkyl" means a straight or branched hydrocarbon chain of the formula $C_nH_{2n+1}$ wherein $n$ represents an integer of from 1 to 3. Illustrative of such alkyl groups are methyl, ethyl, propyl, isopropyl and the like, preferred is methyl.

One important embodiment of the present invention, particularly for preparing solid pharmaceutical formulations, is the pharmaceutically acceptable non-toxic acid addition salts of the compounds of Formula I-A or Formula I-B. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic, enanthic and the like acids.

Pyridyl-2-imidazolones described by foregoing Formula I-A or Formula I-B can be prepared by condensation of an isocyanate with the reactive intermediate obtained by treatment of sulfonic acid esters of oximes with a metal alkoxide, preferably potassium ethoxide. This reaction is followed by acid treatment forming the 2-imidazolones of the present invention and/or 2-imidazolones with a carbamyl group in 3-position. Hydrolysis of the carbamyl substituted compounds with base gives the compounds of Formula I-A or Formula I-B. This process is particularly suitable for the preparation of 1-substituted-5-pyridyl-2-imidazolones.

The reaction can be represented as follows:

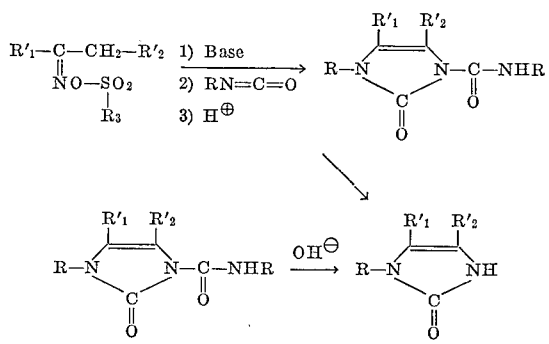

wherein R is as defined above, $R_1'$ is pyridyl, $R_2'$ is hydrogen or lower alkyl and $R_3$ is phenyl or tolyl.

1-substituted-4-pyridyl-2-imidazolones described by foregoing Formula I-A or Formula I-B can be prepared by condensation of an α-isonitrosoketone, formaldehyde, and an amine.

The compounds of the present invention demonstrate the properties of inhibiting and reducing inflammation, relieving pain and reducing fever in warm-blooded animals when administered orally or parenterally. They are thus useful as anti-inflammatory, analgesic and fever-reducing agents particularly the 5-pyridyl-2-imidazolones of Formula I-A or Formula I-B. The anti-inflammatory property of this class of compounds can be conveniently observed in the laboratory model in such art recognized tests as the turbidity model and anticarrageenin tests. The analgesic activity can be observed in the acetic acid stretch test.

According to this invention, the compounds of Formula I-A or Formula I-B are administered to mammals for the purpose of treating various inflammatory conditions, i.e. diseases or other conditions of mammals which are commonly treated with known anti-inflammatory agents, such as arthritis, rheumatism, and related diseases of an inflammatory nature. They are particularly suited for inflammatory conditions accompanied by pain. The compounds of Formula I-A or Formula I-B are also suitable for the relief of pain and the reduction of fever.

The following description of using and making the invention represents the best modes presently contemplated for carrying out the invention. For use as anti-inflammatory, antipyretic and analgesic agents, the compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of the finely divided compound and a water-soluble diluent such as sucrose, glucose, and the like is wetted with a binder such as acacia mucilage, gelatin solution, methyl-cellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into slugs. The slugs can be lubricated to prevent sticking to the tablet forming dies by means of the addition of stearic acid, a stearate salt, talc, or mineral oil. The lubricating mixture is then compressed into tablets. A protective coating consisting of a sealing coat of shellac, a coating of sugar and methylcellulose, and a polish coating of carnauba wax may be provided.

Oral fluids are prepared in unit dosage forms such as syrups and elixirs wherein each teaspoonful of composition contains a predetermined amount of the compound for administration.

A syrup is prepared by suspending the compound in a suitably flavored aqueous sucrose solution. Similarly, an elixir is prepared utilizing a nontoxic alcohol vehicle.

For parenteral administration, aqueous and oleaginous fluid unit dosage forms can be prepared. In preparing the parenteral form, a measured amount of the compound is placed in a vial, the vial and its contents sterilized and sealed. An accompanying vial of sterile water may be provided as a vehicle to form a suspension prior to administration. Particularly suitable for parenteral administration are the addition salts of the compounds of formula I–A or formula I–B.

The amount of these compounds which is administered in use to effect an anti-inflammatory and analgesic response must in all cases be adjusted to the animal being treated, its age, weight, and condition as well as the degree of response required. Thus while anti-inflammatory and analgesic response is observed for these compounds in the range of about 10 mg./kg. to about 300 mg./kg. p.o., the actual dose should be carefully tiltrated to the particular subject in accordance with well recognized principles of pharmacology.

The following examples are given by way of illustrating the process for the preparation of the compounds and the compositions without limiting the scope thereof in any way. The temperatures are given in degrees centigrade.

EXAMPLE 1

1-allyl-5-methyl-4-(3-pyridyl)-2-imidazolone (a) The starting material 1-(3-pyridyl)-1-hydroxyimino-2-propanone is prepared according to the method described by W. F. Beech: J. Chem. Soc. 1955, p. 3074.

(b) A solution of 5 g. of 1-(3pyridyl)-1-hydroxy-imino-2-propanone, 10 ml. of 37% aqueous formaldehyde, and 2.5 ml. of allyl amine in 100 ml. of ethanol are refluxed for 24 hours. The cooled reaction mixture is concentrated under reduced pressure. Upon dilution with ethyl acetate and cooling, the residual tan oil precipitates as white crystals having a melting point of 160–162° C. Recrystallization from ethyl acetate yields the desired imidazolone as white needles, M.P. 160.1–161.5° C.

EXAMPLE 2

1-methyl-5-(2-pyridyl)-2-imidazolone (a) The starting material 2-acetylpyridine O-toluene-p-sulfonyl oxime is prepared according to R. Clemo et al.: J. Chem. Soc. 1938, p. 753.

(b) A fine suspension of 180 g. 2-acetylpyridine O-toluene-p-sulfonyl oxime in 490 ml. of absolute ethanol is cooled under nitrogen atmosphere while a solution of potassium ethoxide (prepared from 27.2 g. of potassium) in 435 ml. of absolute ethanol is added. The resulting suspension is stirred at ice-bath temperature for one hour, and a solution of potassium ethoxide (prepared from 27.2 of potassium) in 435 ml. of absolute ethanol is added again. The resulting suspension is stirred at room temperature overnight, the salts are removed by filtration and the ethanol is evaporated. The residue is suspended in 400 ml. of cold water and is extracted into chloroform. The chloroform solution is dried over sodium sulfate and the solvent is removed by evaporation.

(c) A solution of 72.9 g. of the obtained intermediate in 820 ml. of chloroform is cooled under nitrogen atmosphere while a solution of 76.2 g. of methyl isocyanate in 250 ml. of dry chloroform is added. The resulting solution is stirred at room temperature, the solvent is evaporated, and the residue is purified by dissolving it in ether, filtering off ether-insoluble material, and evaporating the ether.

(d) The urea obtained according to 2c is dissolved in 2770 ml. of water and 918 ml. of 1 N sulfuric acid. The solution is heated at reflux under nitrogen atmosphere for 3 hours. The solution is washed with ether (2×250 ml.) and is rendered basic by means of 300 ml. of a saturated sodium carbonate solution to a pH of 9. Recrystallization of the precipitate from benzene yields 1-methyl-3-(N-methyl-carbamyl)-5-(2-pyridyl)-2-imidazolone which melts at 179–182° C.

(e) A suspension of 30.00 g. of 1-methyl-3-(N-methyl-carbamyl)-5-(2-pyridyl)-2-imidazolone in 300 ml. of 3 N sodium hydroxide is heated at reflux under nitrogen atmospehere for 4½ hours. The pH of the solution is adjusted to pH 9 with 3 N hydrochloric acid. The precipitate is recrystallized from 300 ml. of isopropanol. The obtained compound melts at 210–213° C.

EXAMPLE 3

1-methyl-5-(4-pyridyl)-2-imidazolone (a) The starting material 4-acetylpyridine-O(p-toluenesulfonyl)oxime is prepared according to a method described by Van der Meer et al. Rec. 72, 236 (1953).

(b) A fine suspension of 180 g. of 4-acetylpyridine-O(p-toluenesulfonyl)oxime in 490 ml. of ethanol is cooled under nitrogen atomsphere while a solution of potassium ethoxide (prepared from 27.2 g. of potassium) in 435 ml. of ethanol is added. After the addition of another 350 ml. of alcohol, the suspension is stirred on ice for one hour, then cooled while a solution of potassium ethoxide (prepared from 27.2 g. of potassium) in 435 ml. of ethanol is added. The suspension is stirred at room temperature, the salts are removed by filtration, the solvent is evaporated under reduced pressure, and the residue is dissolved in a mixture of water and chloroform (300:100). The aqueous phase is extracted 3 times with 100 ml. of chloroform; the organic layers are combined, washed, and dried over sodium sulfate. The solvent is evaporated, the residual oil is suspended in anhydrous ether, the insoluble material is removed and the solution is evaporated to dryness. The resulting oil is distilled under high vacuum and nitrogen atmosphere to yield an oil with a boiling point of 90–95° C. at 0.025 mm. Hg.

(c) A solution of 340 ml. of chloroform containing the aziridine intermediate prepared according to 3b is immediately cooled under nitrogen atmosphere while a solution of 119 g. of methyl isocyanate in 100 ml. of chloroform is added. The resulting solution is stirred at room temperature, the solvent is evaporated, and the residue is suspended in ether. A reddish oil is obtained after the ether-insoluble material is removed and the ether is evaporated.

(d) A solution of the oil obtained according to 3d in 6000 ml. 0.5 N sulfuric acid is heated at reflux under nitrogen atmosphere for 3 hours. The solution is cooled, washed twice with 250 ml. of ether, and 200 ml. of saturated potassium carbonate solution is added to adjust the pH to 9. The precipitate is purified and eventually recrystallized from 250 ml. of benzene. The desired 1-methyl-3-(N-methyl-carbamyl)-5-(4 - pyridyl) - 2 - imidazolone melts at 190–191° C.

(e) A suspension of 50.00 g. of 1-methyl-3-(N-methylcarbamyl)-5-(4-pyridyl)-2-imidazolone in 500 ml. of 3 N sodium hydroxide is heated at reflux for 4½ hours under nitrogen atmosphere. The resulting solution is cooled, the pH adjusted to 9 with 3 N hydrochloric acid. The precipitate is collected and washed with water. The obtained product is purified and finally recrystallized from 400 ml. of a mixture of isopropanol and hexane (1:1) in the presence of 10 ml. of triethylamine. The compound melts at 190–192° C.

EXAMPLE 4

1,4-dimethyl-5-(2-pyridyl)-2-imidazolone (a) The starting material 2-propionylpyridine oxime is prepared according to a method described by Craig, J. Am' Chem. Soc. 56, 1144–7 (1934).

(b) A suspension of 28.65 g. of 2-propionylpyridine and 59 g. of hydroxylamine hydrochloride in 930 ml. of 90% ethanol is heated under reflux overnight. The ethanol is removed under reduced pressure and the pH of the aqueous solution is adjusted to 9 with 130 ml. of a saturated potassium carbonate solution. The purified product melts at 107–110° C. after recrystallization from 100 ml. of benzene. The obtained product is 2-propionylpyridine oxime.

(c) A suspension of 21.28 g. of 2-propionylpyridine oxime in 142 ml. of dry pyridine is cooled while 36.9 g. of p-toluene sulfonyl chloride is added. The resulting suspension is stirred at room temperature, poured into 430 ml. of ice water, and the precipitate collected, washed and dried. The obtained 2-propionylpyridine-O-(toluene-p-sulfonyl)oxime melts at 68–70° C.

(d) A fine suspension of 9.43 g. of 2-propionylpyridine-O-(toluene-p-sulfonyl)oxime in 490 ml. of ethanol is cooled under nitrogen atmosphere while a solution of potassium ethoxide (prepared from 136 g. of potassium) in 21.8 ml. of ethanol is added. The resulting mixture is stirred on ice for one hour and a solution of potassium ethoxide (prepared from 1.36 g. of potassium) in 21.8 ml. of ethanol is added again. The resulting suspension is stirred at room temperature overnight, the salts are removed by filtration, the mother liquor is evaporated to dryness, and the residue is suspended in 20 ml. of cold water. The aqueous mixture is extracted with 70 ml. of methylene chloride, and the extract is dried over sodium sulfate.

A solution of 3.64 g. of the residue obtained in 65 ml. of methylene chloride is cooled under nitrogen atmosphere while a solution of 4.28 g. of methyl isocyanate in 14 ml. of methylene chloride is added. The resulting solution is stirred at room temperature and evaporated to dryness. The obtained oil is dissolved in a mixture of 150 ml. of water and 58.4 ml. of 1 N sulfuric acid while cooling. The solution is heated under reflux and nitrogen atmosphere for 3 hours. The mixture is cooled, washed with ether, made basic to pH 9 with saturated potassium carbonate solution, and the precipitate which melts at 136–138° C. is collected. The obtained 1,4 - dimethyl-3-(N-methylcarbamyl)-5-(2-pyridyl)-2-imidazolone is purified and finally recrystallized from 40 ml. of a mixture of benzene-hexane (1:3). The product melts at 138–139° C.

(e) A solution of 1 g. of 1,4-dimethyl-3-(N-methyl-carbamyl)-5-(2-pyridyl)-2-imidazolone in 9.45 ml. of 3 N sodium hydroxide solution is heated under reflux under nitrogen atmosphere for 4½ hours. The mixture is cooled, the pH adjusted to 9 with 3 N hydrochloric acid and the precipitate collected. The precipitate is purified, finally recrystallized from 4 ml. of ethyl acetate to yield the desired compound which melts at 164–166° C.

EXAMPLE 5

1-allyl-5-(2-pyridyl)-2-imidazolone (a) A fine suspension of 90 g. of 2-acetyl pyridine-O-(toluene-p-sulfonyl)oxime, prepared according to Example 2, in 245 ml. of absolute ethanol is cooled to 0° C. under nitrogen atmosphere while a solution of potassium ethoxide (prepared from 13.6 g. of potassium) in 217 ml. of absolute ethanol is added. The suspension is stirred at ice-bath temperature for one hour and a solution of potassium ethoxide (prepared from 13.6 g. of potassium) in 217 ml. of absolute ethanol is again added. The resulting suspension is stirred at room temperature overnight and the salts are removed by filtration through hy-flo. The ethanol is evaporated in vacuo without heat and the residue is dissolved in 200 ml. of ice water. The aqueous solution is immediately extracted into methylene chloride, dried over sodium sulfate and the solution concentrated by evaporation. The 850 ml. of solution containing the intermediate is cooled under nitrogen atmosphere while a solution of 66.7 g. of allyl isocyanate in 150 ml. of methylene chloride is added. The solution is stirred at room temperature overnight and the solvent is evaporated under reduced pressure. A solution of the oil in 1000 ml. of water and 450 ml. of 1 N sulfuric acid is heated at reflux under nitrogen atmosphere for 3 hours and cooled. 1 - allyl-3-(N-allylcarbamyl)-5-(2-pyridyl)-2-imidazolone is removed by filtration and recrystallized from cyclohexane. The compound melts at 114–116° C.

The aqueous filtrate is washed with ether, basified to pH 9 with saturated sodium carbonate solution and extracted with chloroform (4× 400 ml.). The combined chloroform extracts are dried over sodium sulfate and evaporated to dryness. The crude product is crystallized from ether and finally recrystallized from ethyl acetate. The desired 1-allyl-5-(2-pyridyl)-2-imidazolone melts at 130–132°.

What is claimed is:

1. A compound of the formula

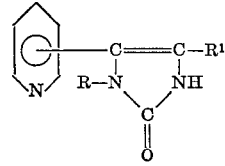

or the formula

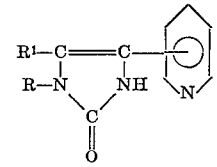

wherein

R is lower alkyl or allyl; and
R¹ is hydrogen or lower alkyl.

2. A therapeutically acceptable acid addition salt of a compound as defined in claim 1.

3. A compound of the formula

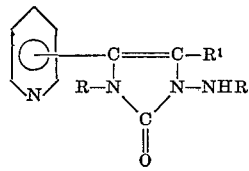

or of the formula

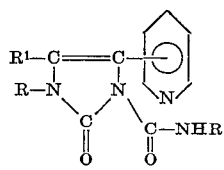

wherein

R is lower alkyl or allyl; and
$R^1$ is hydorgen or lower alkyl.

4. A compound as defined in claim 1 wherein said compound is 1-methyl-5-(2-pyridyl)-2-imidazolone.

5. A compound as defined in claim 1 wherein said compound is 1-methyl-5-(4-pyridyl)-2-imidazolone.

6. A compound as defined in claim 1 wherein said compound is 1,4-dimethyl-5-(2-pyridyl)-2-imidazolone.

7. A compound as defined in claim 1 wherein said compound is 1-allyl-5-(2-pyridyl)-2-imidazolone.

8. A compound as defined in claim 1 wherein said compound is 1-allyl-5-methyl-4-(3-pyridyl)-2-imidazolone.

9. A compound as defined in claim 3 wherein said compound is 1 - methyl-3-(N-methylcarbamyl)-5-(2-pyridyl)-2-imidazolone.

10. A compound as defined in claim 3 wherein said compound is 1 - methyl-3-(N-methylcarbamyl)-5-(4-pyridyl)-2-imidazolone.

11. A compound as defined in claim 3 wherein said compound is 1,4 - dimethyl-3-(N-methylcarbamyl)-5-(2-pyridyl)-2-imidazolone.

12. A compound as defined in claim 3 wherein said compound is 1 - allyl-3-(N-allylcarbamyl)-5-(2-pyridyl)-2-imidazolone.

References Cited

Wright et al.: Journal of Organic Chemistry, vol. 26, pp. 4051–7, ct. 1961. Qd 241J6.

ALAN L. ROTMAN, Primary Examiner

U.S. Cl. X.R.

260—295; 424—266